United States Patent
Kunze (10) Patent No.: US 11,161,182 B2
(45) Date of Patent: Nov. 2, 2021

(54) FOUR-EDGED DRILL

(71) Applicant: GUEHRING KG, Albstadt (DE)

(72) Inventor: Philipp Kunze, Neckartailfingen (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 16/815,452

(22) Filed: Mar. 11, 2020

(65) Prior Publication Data

US 2020/0282473 A1    Sep. 10, 2020

Related U.S. Application Data

(63) Continuation of application No. PCT/EP2018/073886, filed on Sep. 5, 2018.

(30) Foreign Application Priority Data

Sep. 15, 2017    (DE) ............. 10 2017 216 393.3

(51) Int. Cl.
*B23B 51/00*    (2006.01)
*B23B 51/06*    (2006.01)

(52) U.S. Cl.
CPC ............ *B23B 51/00* (2013.01); *B23B 51/06* (2013.01); *B23B 2251/085* (2013.01); *B23B 2251/204* (2013.01); *B23B 2251/422* (2013.01)

(58) Field of Classification Search
CPC ... B23B 51/00; B23B 51/06; B23B 2251/085; B23B 2251/204; B23B 2251/422
See application file for complete search history.

(56) References Cited

U.S. PATENT DOCUMENTS 327,148 A *    9/1885    Faught ............... B23B 51/00
                                                  408/229
1,000,067 A *    8/1911    Bennett .............. B23B 51/108
                                                  408/224

(Continued)

FOREIGN PATENT DOCUMENTS

DE        1031951 B *    6/1958    ............. E21B 10/26
DE    600 19 929 T2    2/2006

(Continued)

OTHER PUBLICATIONS

International Search Report and Written Opinion of the International Searching Authority (and English Translation) from a corresponding International patent application (PCT/EP2018/073886) dated Jan. 14, 2019, 26 pages.

(Continued)

*Primary Examiner* — Eric A. Gates
(74) *Attorney, Agent, or Firm* — Burr & Brown, PLLC (57) ABSTRACT

The invention relates to a four-edged drill having two long main cutting edges, arranged in a point-symmetric manner with regard to the axis of rotation, which each extend from an outer circumferential cutting corner to a chisel edge in the middle of the drill tip, and two short main cutting edges, arranged in a point-symmetric manner with regard to the axis of rotation, which each extend from an outer circumferential cutting corner in the direction of the middle of the drill tip. According to the invention, each long main cutting edge has an outer partial cutting edge, extending from the cutting corner as far as a shoulder, and an inner partial cutting edge, extending from the shoulder as far as the chisel edge, said inner partial cutting edge having a greater cutting height ($\Delta x$) than the outer partial cutting edge and the short main cutting edges.

22 Claims, 4 Drawing Sheets

(56) References Cited

U.S. PATENT DOCUMENTS

| | | | | |
|---|---|---|---|---|
| 4,137,002 A | * | 1/1979 | Barker | B23B 51/00 408/59 |
| 4,889,200 A | * | 12/1989 | Moser | B23B 51/02 175/394 |
| 5,173,014 A | | 12/1992 | Agapiou et al. | |
| 6,588,519 B2 | * | 7/2003 | Knoller | B23B 51/02 175/415 |
| 6,698,981 B1 | | 3/2004 | Beno et al. | |
| 6,868,924 B2 | * | 3/2005 | Haussmann | B23B 51/02 175/323 |
| 6,910,838 B2 | * | 6/2005 | Fuss | B23B 51/02 175/394 |
| 7,497,282 B2 | * | 3/2009 | Batliner | B23B 51/02 175/415 |
| 7,861,807 B2 | * | 1/2011 | Probst | B28D 1/146 175/420 |
| 8,225,889 B2 | * | 7/2012 | Wetter | B23B 51/02 175/415 |
| 8,734,067 B2 | * | 5/2014 | Saito | B23B 51/00 408/224 |
| 9,409,239 B2 | * | 8/2016 | Higashiwaki | B23B 51/009 |
| 10,183,343 B2 | * | 1/2019 | Roth | B23B 51/02 |
| 2003/0077134 A1 | | 4/2003 | Moser et al. | |
| 2006/0243496 A1 | | 11/2006 | Widmann | |
| 2012/0121351 A1 | | 5/2012 | Deeg | |
| 2016/0001379 A1 | | 1/2016 | Kauper | |

FOREIGN PATENT DOCUMENTS

| | | |
|---|---|---|
| DE | 10 2009 024 256 A1 | 12/2010 |
| DE | 10 2009 031 193 A1 | 12/2010 |
| DE | 10 2014 212 714 A1 | 1/2016 |
| EP | 2 047 932 A2 | 4/2009 |
| EP | 2 535 129 A1 | 12/2012 |
| EP | 3 045 245 A1 | 7/2016 |
| JP | 2016-203369 A1 | 12/2016 |

OTHER PUBLICATIONS

International Preliminary Report on Patentability from a corresponding patent application (PCT/EP2018/073886) dated Mar. 17, 2020, 6 pages.

DPMAregister from a corresponding German Patent Application (DE 10 2017 216 393.3) printed on Jun. 8, 2020, 2 pages.

* cited by examiner

FOUR-EDGED DRILL

The invention relates to a four-edged drill, in particular to a deep-hole drill, for cutting difficulty cuttable cast and light metal materials of the kind used in engine construction.

Such materials can only be processed efficiently given the ability to adjust not only the material of the drill, but also the geometry to the cutting task so as to yield adequate tool lives and paths. U.S. Pat. No. 5,173,014 proposes a spirally grooved, four-edged drill, which for drilling a cast iron engine block has two long main cutting edges arranged in a point symmetrical manner relative to the axis of rotation, which each extend from a chamfered, outer circumferential cutting corner to a chisel edge in the middle of the drill tip, and two short main cutting edges arranged in a point symmetrical manner relative to the axis of rotation, which each extend from a chamfered, outer circumferential cutting corner until into the drill core, but not as far as the middle of the drill tip. Each of the main cutting edges is continuously straight in design, and lies in front of a diametral plane of the drill as viewed in the rotational or cutting direction of the drill. The cutting surfaces forming the main cutting edges each border a primary chip removal trough that is outwardly bent at an inclination, which empties into an allocated, spirally running chip groove. Each cutting edge has a rake angle of 0° from its outer peripheral cutting corner up to its inner end. Provided to the side of the chisel edge are secondary chip removal grooves, which each extend from the primary chip removal groove of a short main cutting edge, and proceed outwardly at an inclination as far as the primary chip removal groove of a long main cutting edge. These secondary chip removal grooves incorporate the outlet openings of two cooling lubricant supply channels.

Due to the long main cutting edges that extend as far as the middle of the drill tip, the drill proposed in U.S. Pat. No. 5,173,014 allows drilling into solid materials. However, the chisel edge that connects the two long main cutting edges has no cutting effect, as in a conventional double-edged spiral drill. It only exerts pressure and friction on the workpiece, and for this reason basically impedes drilling into solid materials. The chips scraped from a workpiece by the chisel edge flow through the secondary chip removal grooves and free surfaces of the long main cutting blades into the primary chip removal grooves and chip grooves. Starting at a sufficiently large feed path, both the two long main cutting edges and the two short main cutting edges cut into a workpiece independently of each other, wherein the chip width of the chips generated by the main cutting edges depends on the length of the respective main cutting edge. The chip removal load is thus distributed among four cutting edges, wherein the load placed on the long main cutting edges is greater than that placed on the short main cutting edges, as a result of which the long main cutting edges can close at an earlier point. At a high feed rate, the larger chip cross section of the wider chips arising at the long main cutting edges can easily lead to chip congestion, in particular while deep drilling.

Proceeding from the drill known from U.S. Pat. No. 5,173,014, the object of the invention is to provide a four-edged drill, in particular a deep-hole drill, for cutting difficulty cuttable cast materials and light metal materials used in motor construction, which even at high feed rates is distinguished by a high stability under load and an improved chip removal.

This object is achieved by a drill with the features in claim 1.

A four-edged (deep-hole) drill according to the invention has a drill tip with two longer or (in the following:) long main cutting edges arranged in a point symmetrical manner relative to the axis of rotation, which each extend from an outer circumferential cutting corner to a chisel edge in the middle of the drill tip, and two shorter or (in the following:) short main cutting edges arranged in a point symmetrical manner relative to the axis of rotation, which each extend from an outer circumferential cutting corner in the direction of, but not as far as, the middle of the drill tip. According to the invention, each long main cutting edge has an outer partial cutting edge extending from the cutting corner up to a step or (in the following:) a shoulder, and an inner partial cutting edge extending from the shoulder as far as the chisel edge. The inner partial cutting edges have a greater cutting height than the outer partial cutting edges and the two short main cutting edges.

As opposed to the tool discussed at the outset, the long main cutting edges in a drill according to the invention are divided into outer partial cutting edges and inner partial cutting edges, wherein the inner partial cutting edges lie higher than the outer partial cutting edges as viewed in an axial or feed direction of the drill, i.e., cut into a workpiece to be processed before the outer partial cutting edges and the two short main cutting edges. The inner partial cutting edges thus form a double-edged tip downwardly offset from the outer partial cutting edges and the short main cutting edges in an axial or feed direction. The higher inner partial cutting edges can thus also be referred to as pre- and solid drilling edges, which allow the drill to cut into solid materials, while the outer partial cutting edges and the short main cutting edges can also be referred to as reaming cutting edges, which are used to bore out the hole generated by the inner partial cutting edges.

On the one hand, the higher inner partial cutting edges lead to a self-centering, which allows the drill to cut into a solid material while drilling a workpiece without running askew. Predrilling is thus not required. This results in a good dimensional and geometrical accuracy of the hole. As opposed to conventional single-lip deep-hole drills, for example, no guide is thus required in the drill according to the invention.

On the other hand, dividing the long main cutting edges results in a load distribution on the inner and outer partial cutting edges. The higher inner partial cutting edges lie in the area of the drill core in which the chip volume is lower while drilling a workpiece than in the area outside of the drill core. Apart from the two outer partial cutting edges, the two short main cutting edges are formed in the outer drill area in which the chip volume is larger. As a result, the chip load in the area of the main cutting edges that cut to a nominal diameter, i.e., up to the cutting edge corners, is distributed to four cutting edges, making it possible to minimize the chip load per cutting edge, and hence also the wear, in particular the cutting corner wear.

Dividing the long main cutting edges into the outer and inner partial cutting edges also provides the option of correspondingly optimally adjusting the inner and outer partial cutting edges to the various chipping conditions independently of each other by correspondingly establishing the cutting wedge angle, correcting the cutting edges, sharpening the chisel edge and taking similar measures.

Another result of dividing the long main cutting edges into the outer and inner partial cutting edges is that two narrower chips arise instead of one broad chip while drilling a workpiece, which collide with each other during removal into the chip groove chambers of the drill, and can therefore break. This yields a good chip removal.

In sum, a (deep-hole) drill can be manufactured according to the invention that is characterized by a good centering, a high concentricity quality, a high smoothness, and a high service life. A drill according to the invention is thus also suitable in particular for generating deep holes in difficultly cuttable cast or light metal materials of the kind used in engine construction.

The cutting height difference between the inner partial cutting edges and the outer partial cutting edges of the long main cutting edges achieved by the downward offset can range from 0.02 to 0.1 times, in particular 0.04 to 0.08 times, the nominal diameter of the drill, i.e., be very small relative to the nominal diameter, so as to counter a diminished stability of the drill.

Advantageous or preferred further developments are the subject of the dependent claims.

Comprehensive tests with varyingly ground drill tips have shown that a good stability under load can be achieved if the outer partial cutting edges of the long main cutting edges and/or short main cutting edges that run in the direction of the middle of the drill from outer circumferential cutting corners end outside of the core diameter of the drill. The drill core cross section is retained as a result, so that a high service life can be ensured. In addition, the load placed on the outer partial cutting edges of the long main cutting edges and/or the short main cutting edges can be limited. The drill configuration allows the core diameter to be expanded to 0.4 to 0.6 times, in particular about 0.5 times, the nominal diameter of the drill, which contributes to a high stability and service life.

If the shorter main cutting edges are longer than the outer cutting edges, i.e., the shorter main cutting edges extend closer to the core diameter of the drill than the outer partial cutting edges, drilling a workpiece will result in an uneven load on the outer partial cutting edges and shorter main cutting edges, thereby enabling a reduction in the tendency of the drill to rattle while the short main cutting edges and outer partial cutting edges of the long main cutting edges penetrate into a workpiece, and thus an increase in the smoothness of the drill.

Point thinning makes it possible to positively influence the cutting characteristics of the inner partial cutting edges and/or the chisel edge of the drill. In this way, the progression of the inner partial cutting edges can be corrected via point thinning with the aim of making them longer and sharper edged than would be the case without point thinning, as a result of which the load can be distributed and diminished over a larger length. In particular, the inner partial cutting edges can be corrected in such a way as to run at an obtuse angle to the outer partial cutting edge of the same main cutting edge. The chisel edge can be point thinned independently thereof, so as to keep it as short as possible and give it sharp edges, making it possible to also reduce the forces in the area of the chisel edge and allowing a pinpoint boring into a solid material. Point thinning also yields an enlargement of the chip groove volume, which facilitates a good chip removal while drilling a workpiece.

For example, the point thinning sections that empty into the outer circumferential chip grooves of the drill for correcting the inner partial cutting edges and shortening the chisel edge can have a roughly V-shaped cross section with rounded base, the opening angle of which lies within a range of 75° to 85°, e.g., at 80°. Good results can be achieved in particular if the point thinning sections each extend at an angle of between 30° and 45° to a cross sectional plane of the drill (a plane transverse to the axis of rotation of the drill). Such large point thinning sections extending from the core to the outer circumference of the drill facilitate a good chip removal. For example, the point thinning sections that correct the inner partial cutting edges can each extend at an angle of about 40°, and the point thinning sections that shorten the chisel edge can each extend at an angle of about 35° to a cross sectional plane of the drill.

The drill can further be point thinned in the core regions that border the short main cutting edges. These point thinning sections with a cross section shaped like a flat trough, for example, can each extend at an angle of 40° to 50°, in particular of about 48°, to a cross sectional plane of the drill from the core region that borders a short main cutting edge as far as the outer circumference of the drill.

The ground drill tip section can be simplified by having the outer partial cutting edges of the long main cutting edges and the short cutting edges have the same tip angle. Analogously thereto, the outer partial cutting edges and inner partial cutting edges of the long main cutting edges can have the same tip angle. For example, the tip angles can lie within a range of 140° to 150°, in particular at 145°.

The two inner partial cutting edges can be arranged at the same cutting height. Analogously thereto, the outer partial cutting edges can be arranged relative to each other at the same cutting height, just as the short main cutting edges relative to each other.

However, the short main cutting edges can also have a defined cutting height difference in relation to the outer partial cutting edges of the long main cutting edges, in particular a larger cutting height. For example, the cutting height difference can lie within a range of 0.01 to 0.03 mm, in particular at 0.02 mm. A defined cutting height difference makes it possible to reduce the tendency of the drill to rattle as the short main cutting edges and outer partial cutting edges of the long main cutting edges penetrate into a workpiece, and thus increase the smoothness of the drill.

The ground drill tip section is further simplified by providing a straight-line design to the short main cutting edges, the inner partial cutting edges of the long main cutting edges and the outer partial cutting edges of the long main cutting edges.

A high cutting edge stability is ensured by arranging each main cutting edge, i.e., the inner and outer partial cutting edges of the long main cutting edges and the short main cutting edges in front of a diametral plane of the drill as viewed in the cutting direction.

A high cutting edge stability is further achieved when the rake angle of the main cutting edges is greater than or equal to 0°.

In order to achieve a high cutting quality, each shoulder can be axially and/or radially relief ground. This measure enables a pinpoint boring into solid material.

The drill according to the invention is preferably designed with straight grooves. Chip grooves running along a straight line are easy, and thus efficient, to produce. The ground drill tip section discussed above ensures a good chip removal, despite the straight running chip grooves.

The removal of chips or chip fragments can be further improved by supplying a cooling lubricant into the chip grooves of the drill. In this regard, the drill can have an interior cooling lubricant supply system with outlet openings that lie in the area of the free surfaces, in particular the secondary free surfaces, of the main cutting edges.

A drill according to the invention can be fabricated out of one piece, i.e., be monolithic in design. Alternatively thereto, the drill can be composed of several components.

Precisely longer drills, e.g., deep-hole drills, can be efficiently manufactured because the four main cutting edges are ground into a cutting head attached to a shank. In this case, the cutting head and shank can be made out of different materials. For example, the cutting head can consist of solid carbide, which ensures a good stability under load. By contrast, the shank can consist of an inexpensive and stable steel material.

A drill according to the invention will be described in more detail below based on an exemplary embodiment shown in the drawings. Shown on.

In the exemplary embodiment shown on the figures, the drill is designed as a four-edged deep-hole drill 10.

Figure 11:
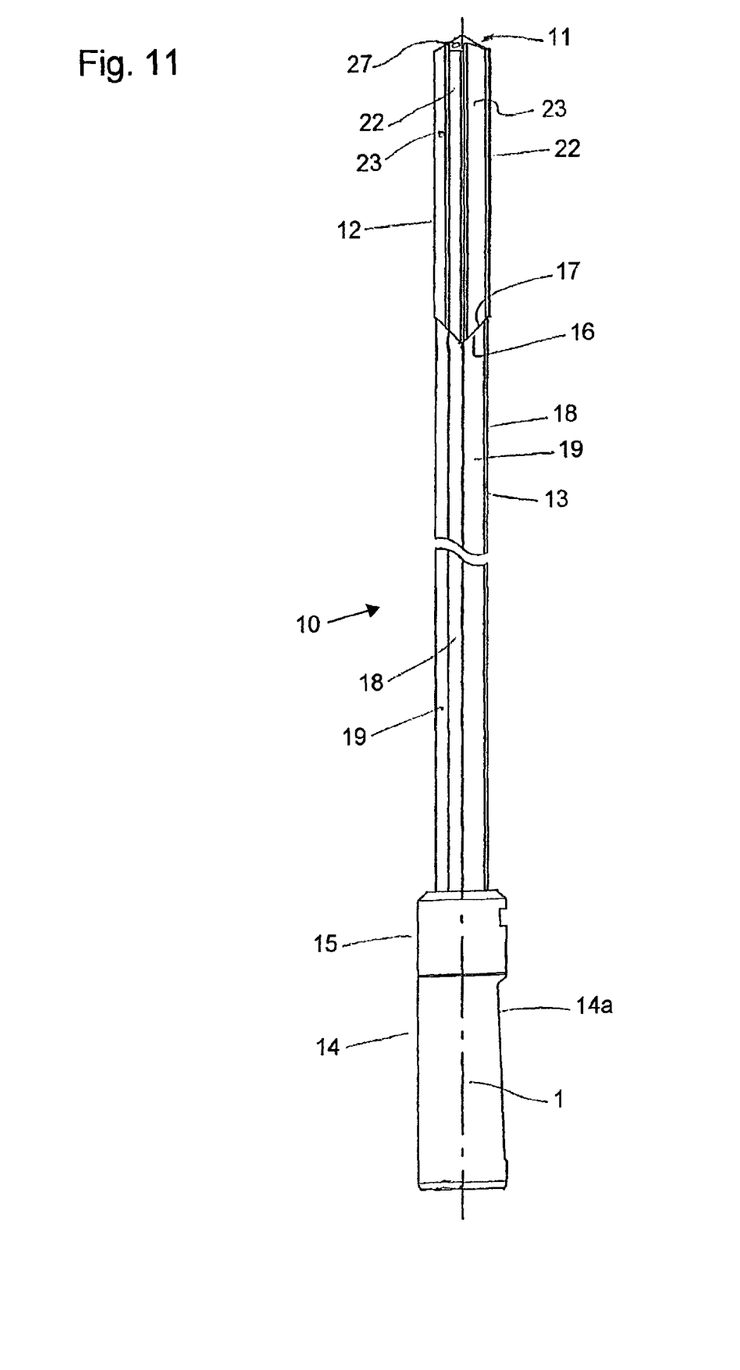
FIG. 11 is a side view of a blank of the four-edged deep-hole drill according to the invention.

FIG. 11 shows a side view of a blank of the deep-hole drill 10, which consists of a shank 13, the cutting head 12 soldered to the shank 10, a clamping sleeve 14 positively joined to the shank 13, and a retaining ring 15 that fixes the shank 13 to the clamping sleeve 14 via jacketing and soldering. The shank 11, clamping sleeve 14 and retaining ring 15 are shown in more detail on FIGS. 12 to 15. A blank of the cutting head is shown in more detail on FIG. 16. As shown on FIGS. 11, 12 and 16, the shank 11 and cutting head 12 are each designed with straight grooves.

In order to connect the cutting head 12 with the shank 13, the end of the shank 13 on the cutting head side has a V-shaped notch 16 referred to as a soldering prism, into which a chisel tip 17 formed on the shank-side end of the cutting head 12 is positively accommodated and materially connected with the shank 13 through soldering.

Figure 12:
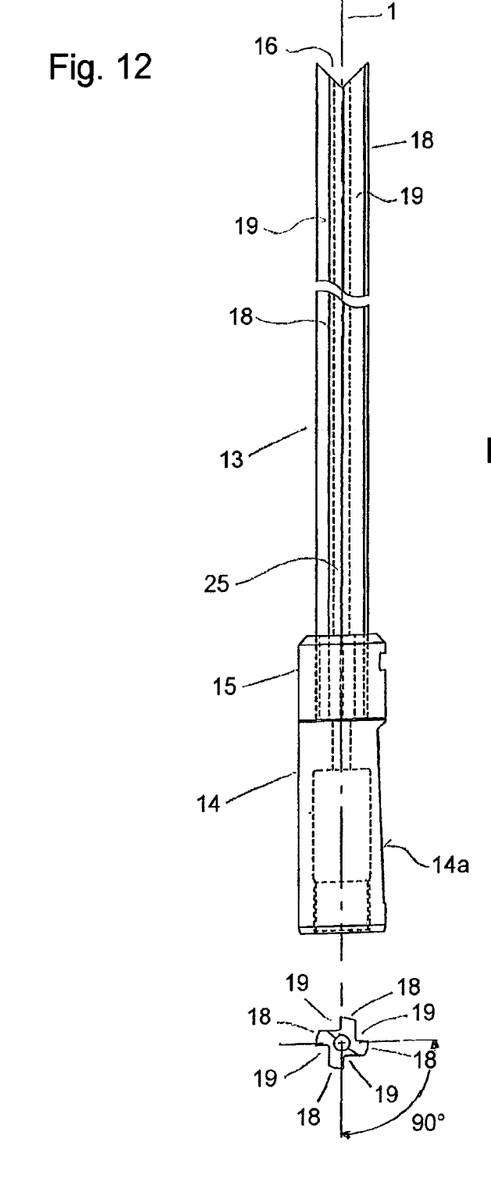
FIGS. 12 to 15 is a respective side view and top view of a shank, a retaining ring and a clamping sleeve of the four-edged drill.
Figure 13:
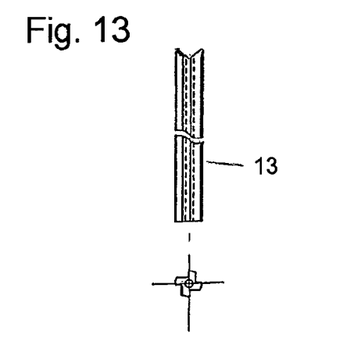

As shown by the top views on FIGS. 12 and 13, the shank has four webs 22 to 18 arranged at an angular distance of 90°, between which is formed a respective chip groove 19 running along a straight line parallel to the axis of rotation 1.

Figure 15:
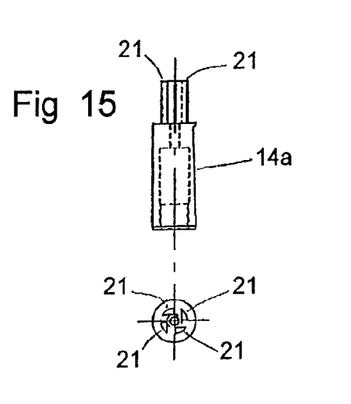

Corresponding to the number of chip grooves 19, the clamping sleeve 14 shown on FIG. 15 has four axial, roughly quadrantal segment-shaped projections 21, which are each positively inserted into one of the chip grooves 19 so as to connect the shank 13 with the clamping sleeve 14. Reference number 14a denotes a clamping surface over which the clamping sleeve 14 can be non-rotatably clamped in a chuck (not shown).

Figure 14:
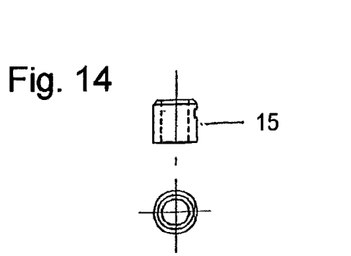

The retaining ring 15 shown on FIG. 14 rests on the interface created in this way between the clamping sleeve 14 and shank 13. In order to fix the shank 13 on the clamping sleeve 14, the retaining ring 15 is soldered with the shank 13 and clamping sleeve 14.

Figure 16:
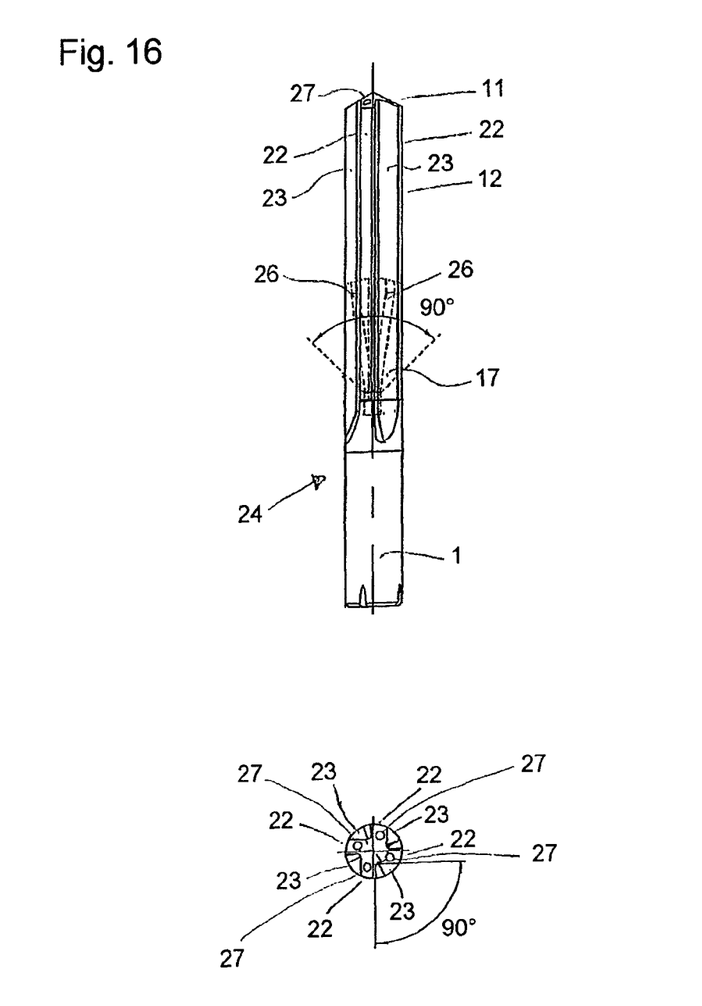
FIG. 16 is a side view and a top view of a cutting head blank of the four-edged drill.

The cutting head 12 is fashioned out of the cutting head blank 24 shown on FIG. 16. The V-shaped dashed line marks the chisel tip 17 of the cutting head 12 to be attached to the V-shaped notch of the shank 16. Analogously to the shank 13, the cutting head 12 has four webs 22 arranged at an angular distance of 90°, between which is formed a respective essentially V-shaped chip groove 23 running along a straight line parallel to the axis of rotation 1 (see top view on FIG. 16).

In the state attached to the shank 13 (see FIG. 11), the chip grooves 19 of the shank axially adjoin the chip grooves 23 of the cutting head 12. As evident from FIG. 11, the cutting head 12 has a somewhat larger diameter than the shank 13.

Shown by dashed lines on FIGS. 12 and 16 is an interior cooling lubricant supply system comprised of a central main channel 25 that extends through the clamping sleeve 14 and shank 13 as far as the cutting head 12, and, corresponding to the number of webs 22 or chip grooves 23, four branch channels 26, which branch away from the main channel 25 immediately after the joint between the shank 13 and cutting head 12, and outlet openings 27, which lie in the area of the subsequently described free surfaces of the four main cutting edges of the cutting head 12. The main channel 25 and branch channels 26 each run along a straight line (holes).

FIGS. 1 to 10 show how the drill tip 11 of the four-edged cutting head 12 is ground, which in the state shown on FIG. 11 is done on the end faces of the cutting head 12. FIGS. 1 to 10 thus present grinding instructions for grinding the drill tip 11 of the cutting head 12.

Figure 1:
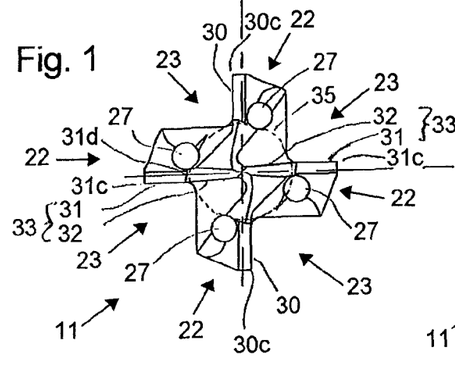
FIG. 1 is a front view of a drill tip of a four-cutting edged deep-hole drill.
Figure 2:
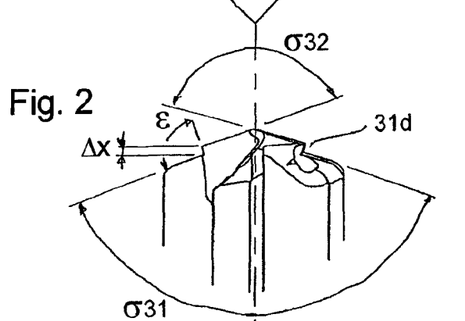
FIGS. 2 to 4 are side views of the drill tip from FIG. 1.

As shown on FIG. 1, four main cutting edges 33 (a main cutting edge 33 per web 22) are formed on the drill tip 11. In the exemplary embodiment shown, the four main cutting edges 33 comprise two longer or (in the following:) long main cutting edges 33 arranged in a point symmetrical manner relative to the axis of rotation 1, which each extend from an outer circumferential cutting corner 31c as far as a chisel edge 34 (see FIG. 7) in the middle of the drill tip 11, and two shorter or (in the following:) short main cutting edges 30 arranged in a point symmetrical manner relative to the axis of rotation, which each extend from an outer circumferential cutting corner 30c in the direction of, but not as far as, the middle of the drill tip 11. According to the invention, each long main cutting edge 33 has an outer partial cutting edge 31 extending from the cutting corner 31c as far as a step or (in the following:) a shoulder 31d (see FIG. 2) and an inner partial cutting edge 32 extending from the shoulder 31d as far as the chisel edge 34.

As viewed in the axial or feed direction of the deep-hole drill 10, the inner partial cutting edges 32 have a greater cutting height than the outer partial cutting edges 31 and the two short main cutting edges 30. The higher inner partial cutting edges 32 can thus also be referred to as pre- and solid drilling edges, which allow the deep-hole drill to cut into solid materials, while the outer partial cutting edges 31 and the short main cutting edges 30 can also be referred to as reaming cutting edges, which are used to bore out the hole generated by the inner partial cutting edges 32 to the nominal diameter of the deep-hole drill.

The higher inner partial cutting edges 32 lie in the area of the drill core 35 of the deep-hole drill 10, while the outer partial cutting edges 31 and the two short main cutting edges 30 lie outside of the core 35. The outer partial cutting edges 31 and the short main cutting edges 30 thus end radially outside of the core 35 or—viewed from the outside in—in front of the core 35. In the exemplary embodiment shown, the diameter of the core 35 measures about 0.4 to 0.6 times, in particular about 0.5 times, the nominal diameter of the deep-hole drill.

The cutting height difference Δx between the inner partial cutting edges 32 and the outer partial cutting edges 31 achieved by the shoulder 31d lies within a range of 0.02 to 0.1 times, in particular of 0.04 to 0.8 times, the nominal diameter of the deep-hole drill 10. As evident from FIG. 2, the shoulder 31d is axially relief ground. For example, the angle indicated with ∈ measures 90°.

A secondary cutting edge that runs along a straight line and is not described here in any greater detail adjoins each of the cutting corners 31c, 30c in the usual manner.

As shown on FIGS. 1 to 10, the outer partial cutting edges 31, the inner partial cutting edges 32 and the short main cutting edges 30 are each straight in design.

In addition, the two outer partial cutting edges 31, the inner partial cutting edges 32 and the short cutting edges 30 are arranged at the same point angles. In the exemplary embodiment, the point angles of the outer partial cutting edges 31, inner partial cutting edges 32 and short main cutting edges 30 indicated with $\delta_{31}$, $\delta_{32}$, $\delta_{30}$ on FIG. 2 and FIG. 8 lie within a range of 140° to 150°, in particular at 145°.

In addition, the two inner partial cutting edges 32 are arranged at the same cutting height. In addition, the outer partial cutting edges 31 are arranged at the same cutting height, and the short main cutting edges 30 are arranged at the same cutting height. In the exemplary embodiment shown, however, the short main cutting edges 30 have a defined cutting height difference relative to the outer partial cutting edges 31, which can lie within a range of 0.01 to 0.03 mm, in particular at 0.02 mm.

In addition, the inner partial cutting edges 32, the outer partial cutting edges 31 and the short main cutting edges 30 lie in front of a diametral plane of the deep-hole drill 10 viewed in the cutting direction, i.e., they cut "before the middle".

The rake angle not indicated on the figures for all main cutting edges, i.e., the inner partial cutting edges 32, the outer partial cutting edges 31 and the short main cutting edges 30, is equal to or greater than 0° in the exemplary embodiment shown.

Figure 7:
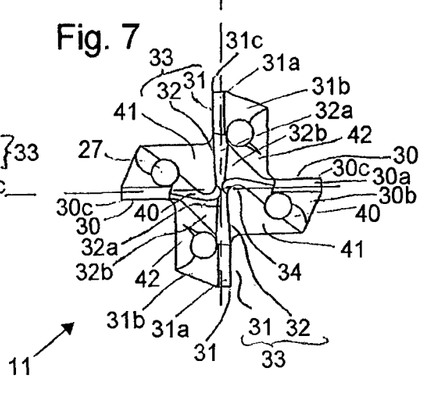
FIG. 7 is a front view of the drill tip rotated by 90° relative to the front view from FIG. 1.
Figure 8:
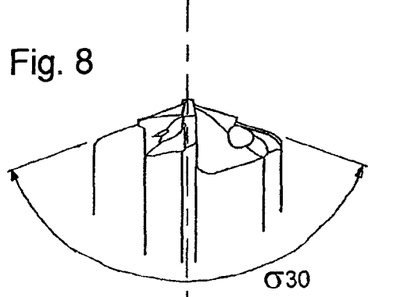
FIGS. 8 and 9 are side views of the drill tip from FIG. 7.

On FIG. 7, reference numbers 31a, 32a and 30a indicate primary free surfaces, and reference numbers 31b, 32b and 30b indicate secondary free surfaces relative to the outer partial cutting edges 32, the inner cutting edges 32 or the short main cutting edges 30.

As further shown on FIG. 7, the outlet openings 27 of the four branch channels 26 of the aforementioned interior cooling lubricant supply system each lie in the area of the free surfaces, in particular in the area of the secondary free surfaces, of an allocated main cutting edge.

Visible on FIGS. 1 to 10 are grinded point thinning sections 40, 41, 42, which result in a shortening of the chisel edge 34 (see FIG. 7), and a correction of the inner partial cutting edges 32 or of the core area lying in front of a short main cutting edge 30 in the sectional or rotational direction. Visible on FIG. 1 or 7 are the point thinning sections grinded into the drill tip 11. The point thinning section 41 corrects the inner partial cutting edge 32, so that the inner partial cutting edge 32 in the exemplary embodiment shown runs at an angle to the outer partial cutting edge 32 of the same main cutting edge. The point thinning section 32 causes the core region lying in front of a short main cutting edge 30 in the rotational or sectional direction to be grinded in.

Figure 9:
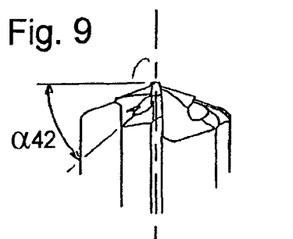
Figure 10:
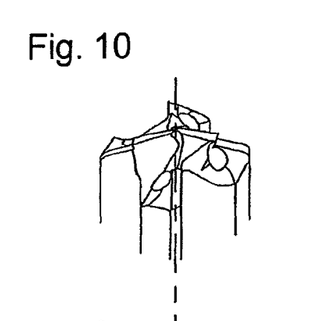
FIG. 10 is a perspective side view of the drill tip from FIG. 7.

The point thinning sections are grinded in using grinding wheels (not shown). The cross sectional contour of each point thinning section is thus determined by the shape of the respectively used grinding wheel. FIGS. 6, 9 and 10 describe the grinded in portions, wherein FIGS. 5, 6 and 10 show the deep-hole drill 10 in a position and alignment in which the grinded in portions extend in a direction perpendicular to the leaf level, while FIGS. 3, 4 and 9 show the angle of inclination $\alpha_{40}$, $\alpha_{41}$, $\alpha_{42}$ of the grinded in portions relative to a plane perpendicular to the rotational axis 11 of the deep-hole drill 10.

Figure 3:
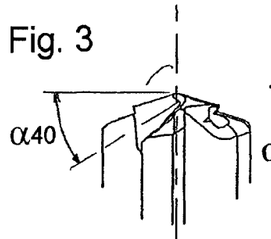
Figure 4:
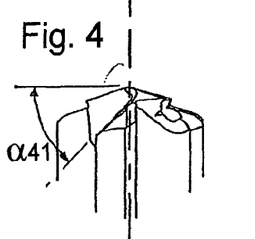
Figures 5, 6:
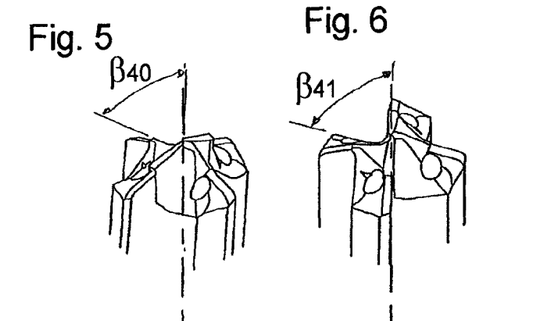
FIGS. 5 and 6 are perspective side views of the drill tip from FIG. 1.

In particular, FIGS. 3 and 5 show a grinded in portion for generating the point thinning section 40 that shortens the chisel edge 34, FIGS. 4 and 6 show a grinded in portion for generating the point thinning section 41 that corrects the inner partial cutting edge 31, and FIGS. 9 and 10 show a grinded in portion for generating the point thinning section 42. The transverse contours of the grinded in portions or point thinning sections 40, 41, 42, and thus the shapes of the respectively used grinding wheels, are discernible on FIG. 5, 6 or 10.

As shown on FIGS. 5, 6 and 10, the point thinning sections 40, 41 or 42, which each empty into an allocated chip groove 23 of the deep-hole drill 10, have a roughly V-shaped cross section with a rounded base, the opening angle of which measures $\beta_{40}$ or $\beta_{41}$ (see FIGS. 5, 6), or a cross section in the form of a flat trough (see FIG. 10). In the exemplary embodiment shown, the opening angle $\beta_{40}$ or $\beta_{41}$ lies within a range of 75° to 85°, e.g., at 80°.

In the exemplary embodiment shown, the aforementioned angles of inclination $\alpha_{40}$, $\alpha_{41}$, $\alpha_{42}$ relative to a plane perpendicular to the axis of rotation 11 of the deep-hole drill 10 lie between 30° and 50°, wherein the angle of inclination $\alpha_{40}$ can measure 35°, the angle of inclination $\alpha_{41}$ can measure 40°, and the angle of inclination $\alpha_{42}$ can measure 48°, for example.

Of course, a drill according to the invention can be modified from the exemplary embodiment described above. For example, the point thinning section described based on FIGS. 1 to 10 can basically be used for drills of any length. Therefore, a drill according to the invention is not necessarily limited to a deep-hole drill.

Contrary to the exemplary embodiment described, a drill according to the invention, for example a deep-hole drill, can further be made out of a single piece, i.e., have a monolithic design.

In addition, a drill according to the invention, for example a deep-hole drill, can be spirally grooved.

Contrary to the described exemplary embodiment, the webs 22 (i.e., the chip grooves 23 or the main cutting edges 30, 33) can be arranged at angular distances different from 90°. Diametrically opposing main cutting edges 33 or 30 can here be arranged in a point symmetrical manner.

In the simplest case, a straight-grooved, four-edged drill, in particular a deep-hole drill, constitutes a separate subject matter independent of the feature combination indicated in claim 1, for which protection can still be claimed at a later time, either in the present application, a subsequent application, by way of a partial application or a split-off utility model.

An independent main claim can thus be directed at a straight-grooved drill, in particular a deep-hole drill, with a drill tip having four main cutting edges. As opposed to the drill from U.S. Pat. No. 5,173,014 discussed at the outset, this type of a drill, in particular a deep-hole drill, can be manufactured more easily and cost-effectively. This main claim can be followed by dependent claims, which relate to additional configuration features of the four-edged drill that arise from the claims, specification and/or drawings of the present application.

For example, the subject matter of a dependent claim can involve the four main cutting edges of the drill being comprised of two long main cutting edges arranged in a point symmetrical manner relative to the axis of rotation, which each extend from an outer circumferential cutting corner as far as a chisel edge in the middle of the drill tip, and two short main cutting edges arranged in a point symmetrical manner relative to the axis of rotation, which each extend from an outer circumferential cutting corner in the direction of the middle of the drill tip.

The subject matter of another dependent claim can be that the four main cutting edges of the drill define a tip downwardly offset in the axial direction in the core. For example, the tip can be achieved by having each long main cutting edge have an outer partial cutting edge extending from the cutting corner as far as a shoulder and an inner partial cutting edge extending from the shoulder as far as the chisel edge, which has a larger cutting height than the outer partial cutting edge and the short main cutting edges.

The subject matter of another dependent claim can be that a respective outlet opening for cooling lubricant be allocated to the four main cutting edges, which lies in back of a respective main cutting edge in the area of the free surface in the rotational or cutting direction.

The invention claimed is:

1. A four-edged drill, with two long main cutting edges arranged in a point symmetrical manner relative to an axis of rotation, which each extend from an outer circumferential cutting corner to a chisel edge in a middle of a drill tip, and two short main cutting edges arranged in a point symmetrical manner relative to the axis of rotation, which each extend from an outer circumferential cutting corner in the direction of the middle of the drill tip,
   each long main cutting edge having an outer partial cutting edge extending from the outer circumferential cutting corner up to a shoulder, and an inner partial cutting edge extending from the shoulder as far as the chisel edge, which have a greater cutting height than the outer partial cutting edge and the short main cutting edges.

2. The drill according to claim 1, wherein each outer partial cutting edge ends outside of a core of the drill.

3. The drill according to claim 1, wherein each short main cutting edge ends outside of a core of the drill.

4. The drill according to claim 1, wherein the short main cutting edges are longer than the outer partial cutting edges.

5. The drill according to claim 1, wherein a core diameter measures 0.4 to 0.6 times the nominal diameter of the drill.

6. The drill according to claim 1, wherein each inner partial cutting edge is corrected over its entire length by a point thinning section.

7. The drill according to claim 6, wherein each inner partial cutting edge runs at an obtuse angle to the outer partial cutting edge of the same main cutting edge.

8. The drill according to claim 1, wherein the chisel edge is point thinned.

9. The drill according to claim 1, wherein the outer partial cutting edges and the short main cutting edges have an identical rake angle.

10. The drill according to claim 1, wherein the outer partial cutting edges and the inner partial cutting edges have an identical rake angle.

11. The drill according to claim 1, wherein the outer partial cutting edges and the short main cutting edges have a defined cutting height difference.

12. The drill according to claim 11, wherein the short main cutting edges have a larger cutting height than the outer partial cutting edges.

13. The drill according to claim 1, wherein the short main cutting edges, the inner partial cutting edges and the outer partial cutting edges each run along a straight line.

14. The drill according to claim 1, wherein the main cutting edges each lie in front of a diametral plane of the drill as viewed in a rotational or cutting direction.

15. The drill according to claim 1, wherein the rake angle of the main cutting edges is greater than or equal to 0°.

16. The drill according to claim 1, wherein the shoulder is axially and/or radially relief ground.

17. The drill according to claim 1, wherein the drill comprises chip grooves that run along a straight line.

18. The drill according to claim 1, wherein the drill comprises an interior cooling lubricant supply system with outlet openings that lie in an area of free surfaces of the main cutting edges.

19. The drill according to claim 1, wherein four main cutting edges are ground into a cutting head attached to a shank.

20. The drill according to claim 1, wherein the four-edged drill is a deep hole drill.

21. The drill according to claim 1, wherein a core diameter measures about 0.5 times the nominal diameter of the drill.

22. The drill according to claim 1, wherein the drill comprises an interior cooling lubricant supply system with outlet openings that lie in an area of secondary free surfaces of the main cutting edges.

* * * * *